Patented June 10, 1924.

1,497,397

UNITED STATES PATENT OFFICE.

RICHARD ZULAUF, OF FRANKFORT-ON-THE-MAIN, GERMANY.

MANUFACTURE OF ENAMELED WRITING TABLETS.

No Drawing. Application filed March 28, 1923. Serial No. 628,381.

*To all whom it may concern:*

Be it known that I, RICHARD ZULAUF, manufacturer, a citizen of the German Republic, residing at Frankfort-on-the-Main, Germany, Stiftstrasse 28, have invented certain new and useful Improvements in the Manufacture of Enameled Writing Tablets, of which the following is a specification.

The object of a prior patent (No. 1438154) granted to me, is a process for the manufacture of writing tablets with an enamel coating of any desired colour using known and practically proved enamel batches or compositions for the first as well as for the finishing coating, in which process the finishing enamel stoved in the usual way is made capable of retaining written characters of any kind by adding to the finishing enamel, when in the wet-mill, a quantity (about 15 per cent and more) of clay considerably exceeding the usual addition (about 8 to 10 per cent). In this way enamel coatings well fit for being written upon, are produced at the usual stoving temperatures of 850 to 900°.

In the course of further experiments it has been found that it is possible to produce excellent enamel coatings to be written upon, without such an increased addition of clay in the wet-mill from known and practically proved enamel masses, by stoving the finishing enamel mass to which in usual manner about 8 to 10 per cent of clay are added in the mill, at a temperature considerably lower than usual. Whereas the finishing enamel masses are commonly stoved at about 850 to 900° C., according to the process under consideration stoving is carried out at a temperature which is lower by about 200 to 250 degrees C.

It is obvious that by lowering the stoving temperature commonly employed, furthermore by avoiding an increased addition of clay to the wet-mill, very considerable savings of fuel as well as of clay (kaolin) are secured.

As mentioned above, the various known batches (or compositions) of finishing enamel masses may be used, it standing by reason that the man skilled in the art will in any case pay regard to the particular qualities desired (colour etc.) and to the practical purposes.

By way of example, the process for manufacturing a black slate-like writing surface of enamel may be described in detail:

An enamel ground is first stoved in known manner and thereupon a finishing enamel which is prepared using about 125 kilogs. of feldspar, about 65 kilogs. of cryolite, about 65 kilogs. of kaolin, about 30 kilogs. of sodium carbonate, about 12 kilogs. of borax, about 3 kilogs. of oxide of cobalt, to which are added in the mill: 9 to 10 per cent of kaolin and 7 to 9 per cent of so-called black pigments. This finishing enamel mass is stoved on at about 650° C. whereby first class writing surfaces are obtained.

If not black or slate-like writing surfaces are to be produced, but enamel coats of any other colour, in the example given above the colouring substances (black pigments and oxide of cobalt) will be replaced by other known colouring matters, in which case the proportions of the enamel batch (or composition) are accordingly to be altered, as is evident to any man skilled in the art.

What I claim is:

A process of manufacturing enamel-coated writing tablets, of any desired colour, comprising, stoving on an enamel ground, a finishing enamel prepared in known manner with the addition of the usual quantity of clay, at a temperature which is less than the usual stoving temperature for finishing enamels, by about 200 degrees centigrade.

In testimony whereof I affix my signature in presence of two witnesses.

RICHARD ZULAUF.

Witnesses:
W. W. SCHOTT,
C. C. L. B. WYLES.